(12) United States Patent
Gammon

(10) Patent No.: US 8,898,054 B2
(45) Date of Patent: Nov. 25, 2014

(54) DETERMINING AND CONVEYING CONTEXTUAL INFORMATION FOR REAL TIME TEXT

(75) Inventor: Scott Peter Gammon, Waterloo (CA)

(73) Assignee: BlackBerry Limited, Waterloo (CA)

( * ) Notice: Subject to any disclaimer, the term of this patent is extended or adjusted under 35 U.S.C. 154(b) by 455 days.

(21) Appl. No.: 13/279,058

(22) Filed: Oct. 21, 2011

(65) Prior Publication Data

US 2013/0103399 A1   Apr. 25, 2013

(51) Int. Cl.
  *G10L 21/00*    (2013.01)
  *G06F 17/21*    (2006.01)
  *G06F 17/27*    (2006.01)
  *G10L 19/00*    (2013.01)
  *G10L 21/10*    (2013.01)
  *G10L 17/00*    (2013.01)
  *G10L 15/26*    (2006.01)

(52) U.S. Cl.
  CPC .............. *G10L 19/0018* (2013.01); *G10L 17/00* (2013.01); *G06F 17/211* (2013.01); *G06F 17/27* (2013.01); *G10L 21/10* (2013.01); *G10L 15/26* (2013.01)
  USPC ........... 704/201; 709/223; 709/224; 709/248; 709/226; 715/209; 715/234

(58) Field of Classification Search
  CPC ... G06F 17/211; G06F 17/24; H04L 41/9213; H04L 29/084; H04L 29/08072; H04L 29/06; H04L 1/20; H04W 4/14; H04W 64/00; G08G 5/0013; H04N 1/00002; H04M 2201/40; G10L 15/265; G10L 15/22; G10L 19/167; G10L 19/24; G10L 19/008; G11C 2207/16
  USPC .......... 715/209, 210, 255; 709/223, 248, 203, 709/224, 229, 226, 228, 219; 455/466, 455/456.5, 67.11; 379/100.05; 375/224; 704/235, 231, 201
  See application file for complete search history.

(56) References Cited

U.S. PATENT DOCUMENTS 5,457,776 A * 10/1995 Wong et al. .................... 715/234
6,128,668 A * 10/2000 Barber et al. .................. 709/246

(Continued)

FOREIGN PATENT DOCUMENTS

EP    2117218 A1    11/2009

OTHER PUBLICATIONS

RTP Payload Format for 3rd Generation Partnership Project (3GPP) Timed Text. Feb. 2006. http://www.rfc-editor.org/rfc/rfc4396.txt.

(Continued)

*Primary Examiner* — Vijay B Chawan
(74) *Attorney, Agent, or Firm* — Novak Druce Connolly Bove + Quigg LLP

(57) ABSTRACT

Aspects relate to machine recognition of human voices in live or recorded audio content, and delivering text derived from such live or recorded content as real time text, with contextual information derived from characteristics of the audio. For example, volume information can be encoded as larger and smaller font sizes. Speaker changes can be detected and indicated through text additions, or color changes to the font. A variety of other context information can be detected and encoded in graphical rendition commands available through RTT, or by extending the information provided with RTT packets, and processing that extended information accordingly for modifying the display of the RTT text content.

18 Claims, 5 Drawing Sheets

(56) References Cited

U.S. PATENT DOCUMENTS

| | | |
|---|---|---|
| 6,175,820 B1 * | 1/2001 | Dietz ........................... 704/235 |
| 6,332,122 B1 | 12/2001 | Ortega |
| 6,785,649 B1 | 8/2004 | Hoory |
| 7,050,109 B2 | 5/2006 | Safadi |
| 7,451,084 B2 | 11/2008 | Funakura |
| 2009/0037171 A1 | 2/2009 | McFarland |
| 2009/0048845 A1 | 2/2009 | Burckart |
| 2010/0094984 A1 * | 4/2010 | Dingler et al. ................ 709/223 |
| 2010/0112990 A1 * | 5/2010 | Dingler et al. ............. 455/414.2 |
| 2010/0130232 A1 * | 5/2010 | Dingler et al. ............. 455/456.3 |
| 2010/0225808 A1 | 9/2010 | Mears |
| 2010/0228546 A1 * | 9/2010 | Dingler et al. ................ 704/235 |
| 2011/0208716 A1 * | 8/2011 | Liu et al. ....................... 707/710 |
| 2012/0034938 A1 * | 2/2012 | Kreitzer et al. ............... 455/466 |

OTHER PUBLICATIONS

3GPP Specification detail Transparent end-to-end Packet switched Streaming Service (PSS); Timed text format. http://www.3gpp.org/ftp/specs/html-info/26245.htm.

Extended European Search Report mailed Apr. 5, 2012; in corresponding application No. 11186158.9.

Office Action mailed Mar. 4, 2014; in corresponding Canadian patent application No. 2,790,307.

* cited by examiner

|  | Packet | Selected Rendition | Text Received |
|---|---|---|---|
| 105 → | X | Font #1 ← 106 | was ← 115 |
| FIG. 5 | .. | .. | going |
|  | .. | .. | to |
|  | .. | ← 107 | be |
| 110 → | .. | Font #2; color | dep ← 118 |
|  | Y | .. Newline; CR ← 112 | ressed. |

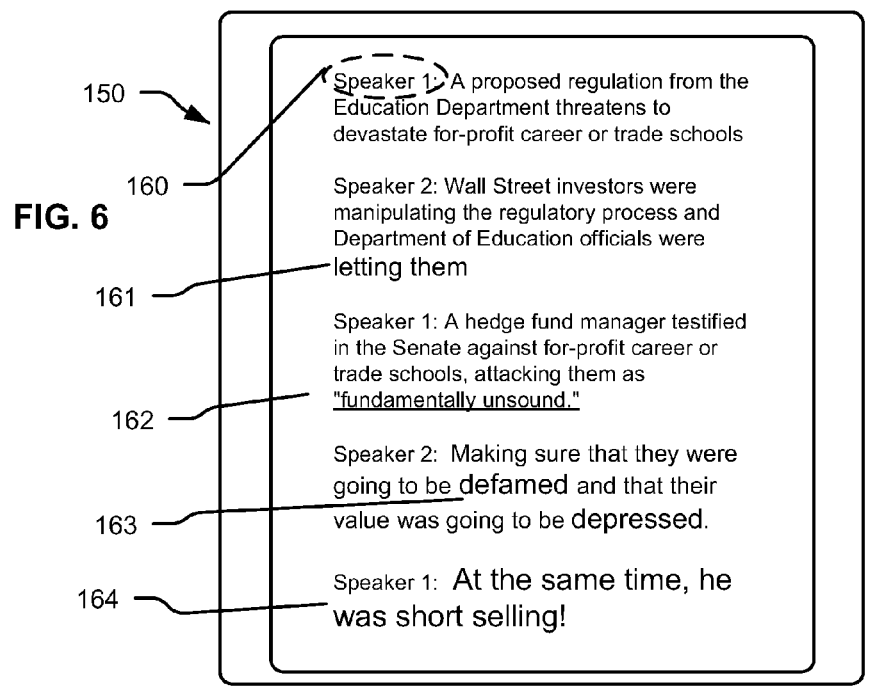

FIG. 6

150 — Speaker 1: A proposed regulation from the Education Department threatens to devastate for-profit career or trade schools 160 — Speaker 2: Wall Street investors were manipulating the regulatory process and Department of Education officials were letting them

161 —

162 — Speaker 1: A hedge fund manager testified in the Senate against for-profit career or trade schools, attacking them as "fundamentally unsound."

163 — Speaker 2: Making sure that they were going to be defamed and that their value was going to be depressed.

164 — Speaker 1: At the same time, he was short selling!

FIG. 7  170

A proposed regulation from the Education Department threatens to devastate for-profit career or trade schools A hedge fund manager testified in the Senate against for-profit career or trade schools, attacking them as "fundamentally unsound."

At the same time, he was short selling!

FIG. 8  180

Wall Street investors were manipulating the regulatory process and Department of Education officials were letting them Making sure that they were going to be defamed and that their value was going to be depressed.

DETERMINING AND CONVEYING CONTEXTUAL INFORMATION FOR REAL TIME TEXT

BACKGROUND

1. Field

The present application relates in one aspect to mobile device communication, and to provision of real time text capabilities, and more particularly to providing real time text capabilities to mobile devices.

2. Related Art

Mobile devices are used for voice and data communications. Even as communications have become richer, such as by increased use of video conferencing, non-verbal communications remains an important way to communicate information. Real time text allows an experience of being able to convey text from a source to a destination practically instantaneously. Additional capabilities relating to text transmission and display remain desirable.

BRIEF DESCRIPTION OF THE DRAWINGS

Reference will now be made, by way of example, to the accompanying drawings which show example embodiments of the present application, and in which:

FIG. 5 depicts RTT packets that can be provided with additional context information, such as graphical rendition information according to ITU T.140;

FIG. 6 depicts an example display in which RTT information can be provided with additional context information introduced into the RTT by an RTT server according to the disclosure;

FIGS. 7 and 8 depict a further example of RTT information display, in which text from two recognized speakers are displayed in different windows.

DESCRIPTION

Mobile devices are increasingly used for communication, such as voice calling and data exchange. Mobile devices also can be used for receiving text information. There are a variety of text-based approaches to information exchange that can be used with mobile devices. One common example is Short Message System (SMS) textual information. Another example is Real Time Text (RTT), which by contrast with SMS, allows near to real time input of text at a first device, communication over a network (using a RTP/UDP) and remote display of such text information at a second device.

It would be beneficial to extend RTT technology to allow greater contextual information to be conveyed for certain types of usage models. One usage model is where machine language recognition is being performed on an audio signal that contains human voices, and the output from the machine language recognition operation is used as text to be transmitted using RTT. In many practical situations of interest, the audio signal may contain a plurality of human voices (i.e., different speakers). Also, the manner of speech of the speakers can change over time; for example, volume, tone, and other dynamic qualities of speech would be apparent to a person listening to the audio signal. In some of the following aspects, further control and contextual information is determined from the audio signal, and used to determine commands or other display parameter information that is useful for a remote viewer, seeing only the text, to understand more of the contextual information present in the original audio signal.

Figure 1:
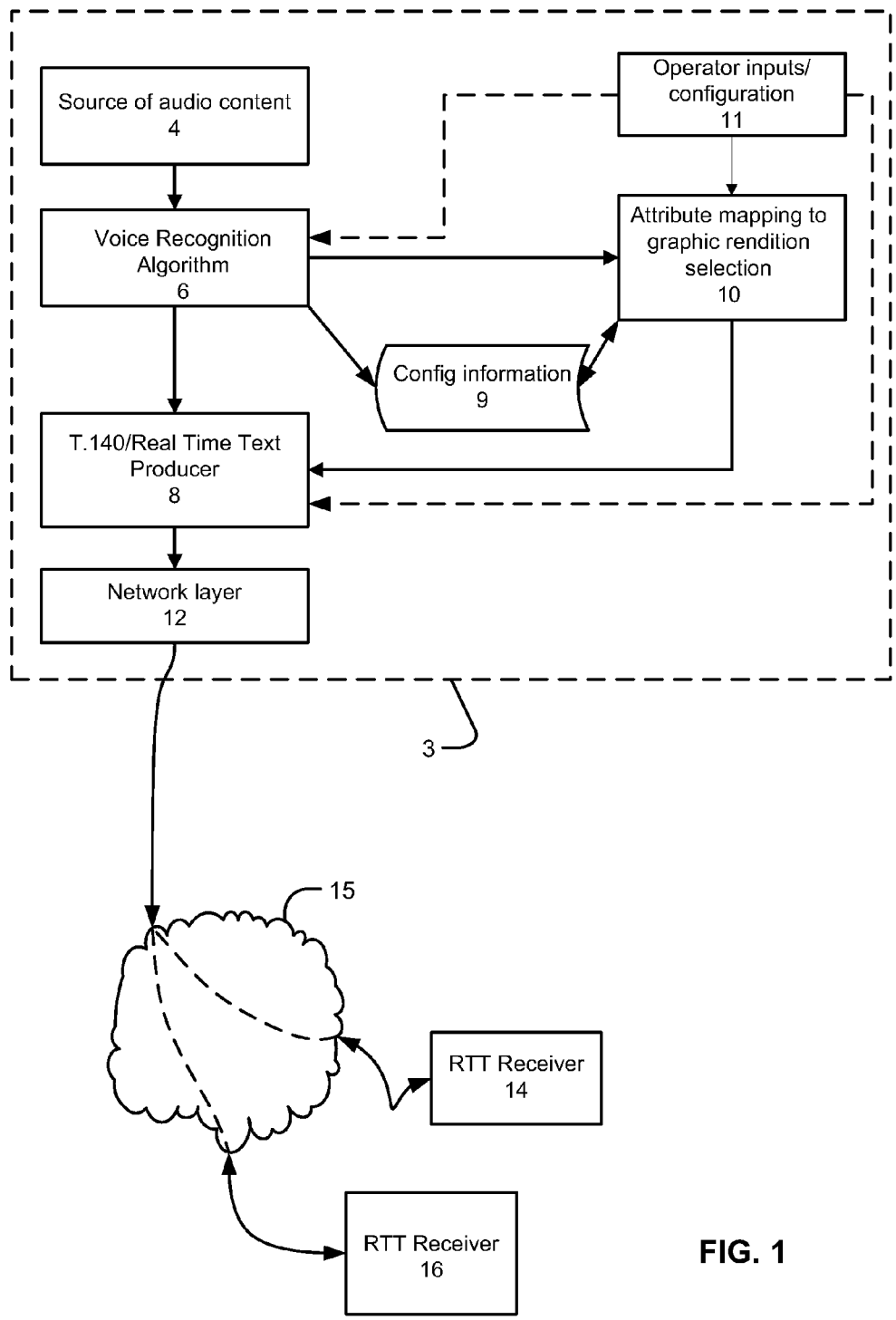
FIG. 1 depicts a context and components of a Real Time Text (RTT) system in which aspects of the description can be practiced.

To that end, FIG. 1 depicts an RTT source 3, which comprises a source of audio content 4. The source of audio content 4 can be a recorded or live audio feed, for example. For example, the audio content 4 can be the audio track from a video broadcast, or can be the recorded audio from a teleconference session, and so on. Source of audio content 4 can perform the audio content as though it were to be consumed by a human (e.g., through a receiver and speaker, not depicted), so as to provide output in an analog or in a digital format, for example. A voice recognition algorithm 6 receives the audio information from the source of audio content 4, and performs voice recognition on the audio information. Alternatively, stored data can be accessed directly from a computer readable medium and processed by voice recognition algorithm 6. Voice recognition algorithm 6 can generate information that can be used throughout an RTT session. For example, voice recognition algorithm 6 can recognize a new speaker, and add that new speaker to a list of recognized speakers. As will be described below, different font colors can be allocated to different speakers. In addition to producing text output, voice recognition algorithm 6 can output information about the context of text being recognized. For example, a relative volume of a given word or phrase can be determined, and outputted to an attribute mapping function 10. Attribute mapping function 10, as alluded to above, can receive contextual outputs from voice recognition algorithm 6, and use those contextual outputs in determining graphical rendition selections for portions of text to which the context outputs apply. The textual output and the graphical rendition selections are fed into a real time text producer 8, which can operate according to ITU T. 140. T.140 is based on the ISO 10646-1 character set and uses the UTF-8 format/encoding for such character set.

Output of producer 8 can be fed into a network layer 12. Network layer 12 can comprise a transport stack, an addressing layer, media access control and physical layer functionality. In one example, the transport/addressing functionality can be provided through UDP/IP. RTT source 3 also can comprise an operator inputs/configuration source 11. For example, an operator can assist in initially identifying speakers present in a given source of audio content. For example, these configuration inputs can associate a textual name for a given speaker, such that attribute mapping can supply the name when the voice recognition algorithm identifies the speaker associated with the name to the attribute mapper 10.

Outputs from RTT source 3 are provided over an internet 15 to RTT receivers 14 and 16. These receivers can function according to the examples provided below to display the provided text information and use the associated graphical rendition selections during such display.

Figure 2:
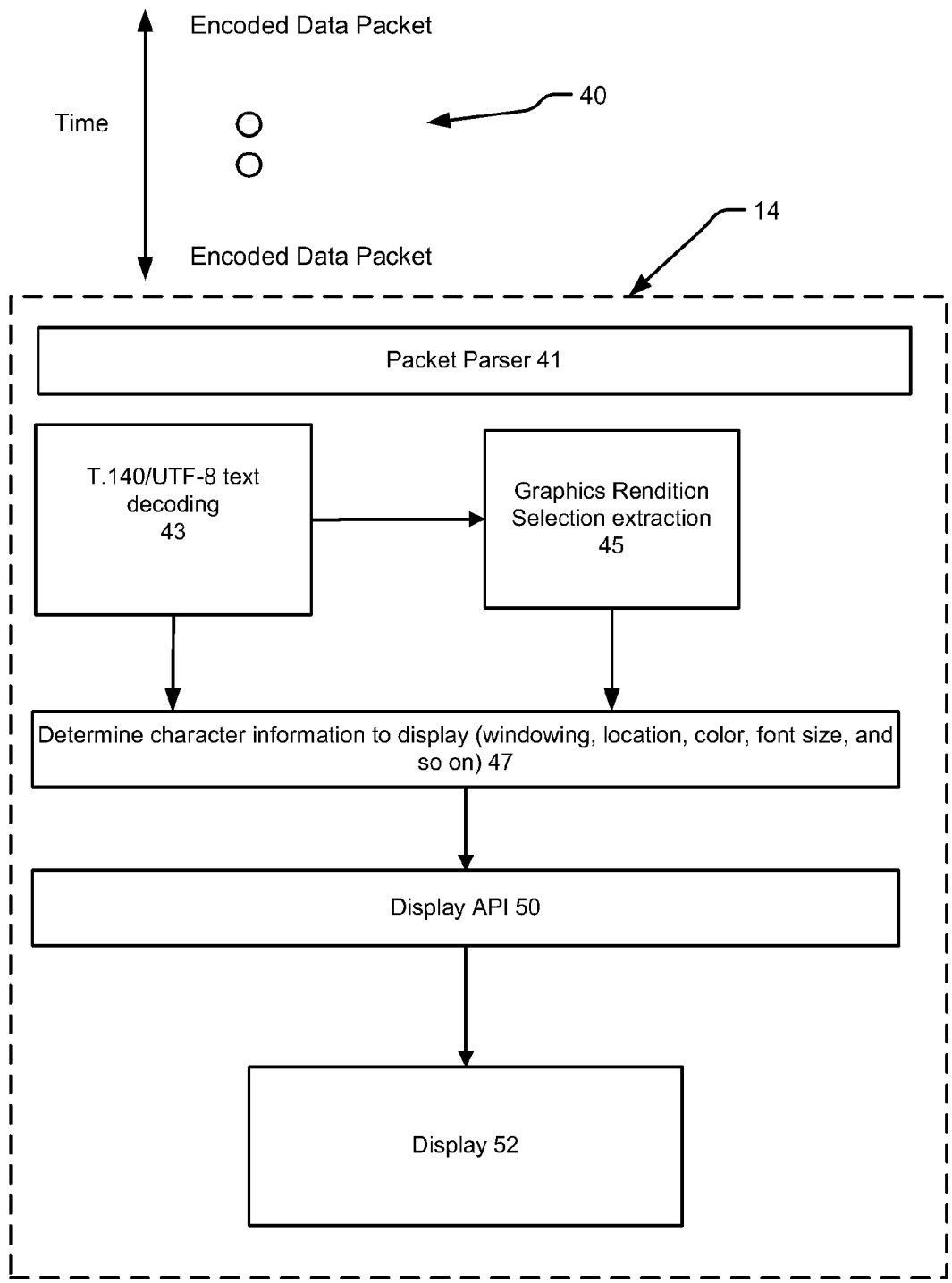
FIG. 2 depicts components of a RTT server in which voices can be recognized by a machine and resulting text can be provided via a real-time text solution, with added context information according to the examples.

FIG. 2 depicts an example where a sequence of encoded packets (collectively 40) is provided to RTT receiver 14. RTT receiver 14 in this example is depicted as having functional units comprising a packet parser 41, which extracts information from the packets that can be used by T.140/UTF-8 text decoder 43, and graphics rendition selection extractor 45. Decoder 43 and extractor 45 provide outputs to a module that integrates the text information and the graphics rendition selection into specific text and formatting to be displayed.

Figure 3:
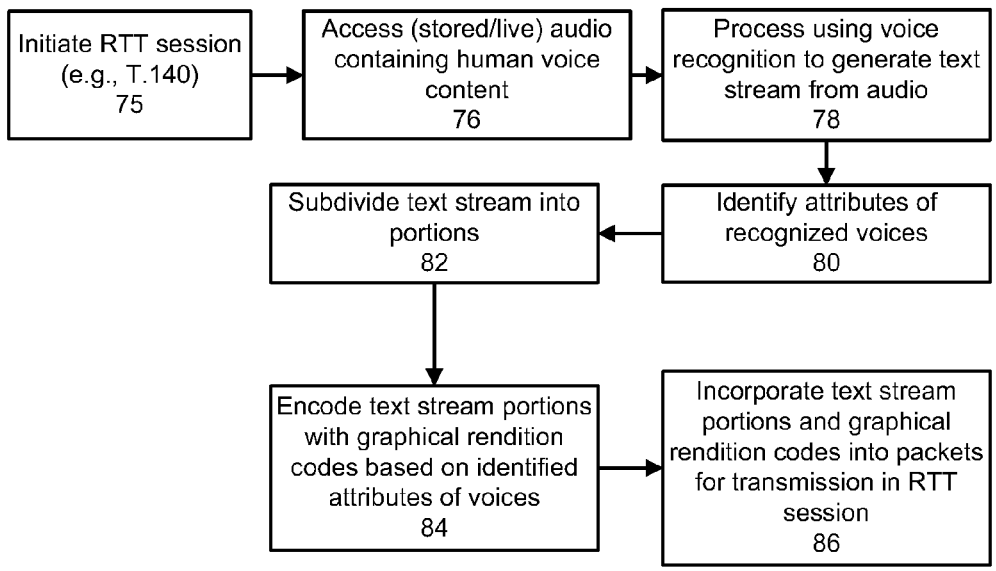
FIG. 3 depicts an example process that can be performed by an RTT server according to the disclosure of FIG. 2.

FIG. 3 depicts an example procedure that can be implemented in RTT source 3. The procedure comprises initiating (75) an RTT session. In one example, an RTT session can be initiated using the Session Initiation Protocol (SIP) with a Session Description Protocol (SDP) specifying a text session (e.g., media type of text).

Given that an RTT session is established, RTT source 3 can access (76) stored or live audio containing human voice content. The human voice content is processed (78) to generate a text stream from the audio. Attributes are identified (80) for the recognized voices, such as distinguishing between or among the speakers recognized in the audio. Information stored in configuration information 9 can be used in such attribute mapping. For example, by being able to make a running list of detected speakers, a recurrent or subsequent utterance from a recognized speaker can be more reliably mapped to a particular graphical rendition selection (e.g., a particular font color or text insert). The text stream can be subdivided (82) into portions and encoded with graphical rendition codes that can be interpreted to indicate differences in presentation of the text in the subdivided portions. Given that one usage of the present technology is presenting text information from recorded or live audio, the rate at which text is presented may be faster than what is typical for typing or other RTT usages. As such, the portions of text transmitted in any given RTT packet may be larger than typical, and can comprise, for example, a series of words or a sentence, and may not be a character by character flow. RTT source 3 can be configured, for example, to dispatch RTT packets on a regular cycle, such as every second, every 2 seconds, or another interval determined to be appropriate for the application. The text stream portions and the graphical rendition codes are then incorporated (86) into packets for transmission in the RTT session to the RTT clients, as described above.

Figure 4:
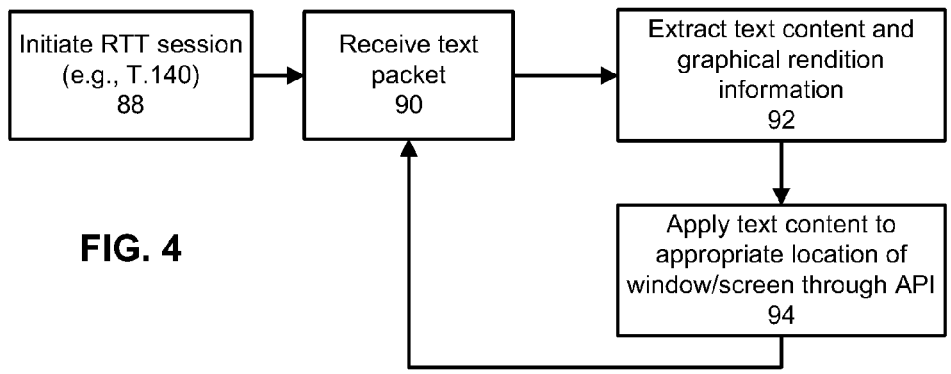
FIG. 4 depicts an example process that can be performed for receiving and processing RTT packets by an RTT server, such as those depicted in FIG. 1.

FIG. 4 depicts an example process for decoding and presenting text portions received in an RTT session at a RTT client. Here, the example process includes initiating an RTT session in cooperation with an RTT source, e.g., RTT source 3. During the session, RTT packets can be received (90), text content and graphical rendition information can be extracted (92) and the text content can be applied to an appropriate location of a window or windows or otherwise displayed (94). An API may be accessed in order to draw or output such text. Further exemplary information concerning this process is found below.

FIG. 5 depicts a series of packets 105 . . . 110 each with respective graphic rendition information 106 . . . 112 and received text 115 . . . 118 (not all packets need to have graphical rendition information, and in one aspect, where a packet does not include any such information, the previous state of the text displayed is carried forward unmodified). The graphical rendition information 106 includes a selected font (font #1), and exemplary rendition information 107 includes a second selected font, and a color change. Rendition information 112 includes a line feed and carriage return.

FIG. 6 depicts an example text display 150 in which recognized text from two speakers (speaker 1 and speaker 2) has been transmitted and displayed. The identification text 160 for speaker 1 can be inserted as text into the RTT stream and displayed as any other text (as can the identification information for speaker 2, and so on, each time that there is a detected change in speaker, as described above). Font size differences 161-164 depict examples of changing font size by word or by sentence to convey context information concerning how those particular text portions were spoken in the audio version. Display 150 also depicts a combined view in which both speaker text is presented in the same window. Because RTP can be used to transmit the text packets, RTP can be used to ensure an in-order display of such text.

FIG. 7 and FIG. 8 depict a situation where the text for each speaker can be split into two different windows 170 and 180 according to speaker. In one approach, the text identifying the speaker can be used as a trigger to determine which window the text should be displayed in, and then can be redacted. As described above, colors of the text displayed also can be used to indicate any one or more of a variety of conditions or sources of a given word or line or group of lines of text.

Figure 9:
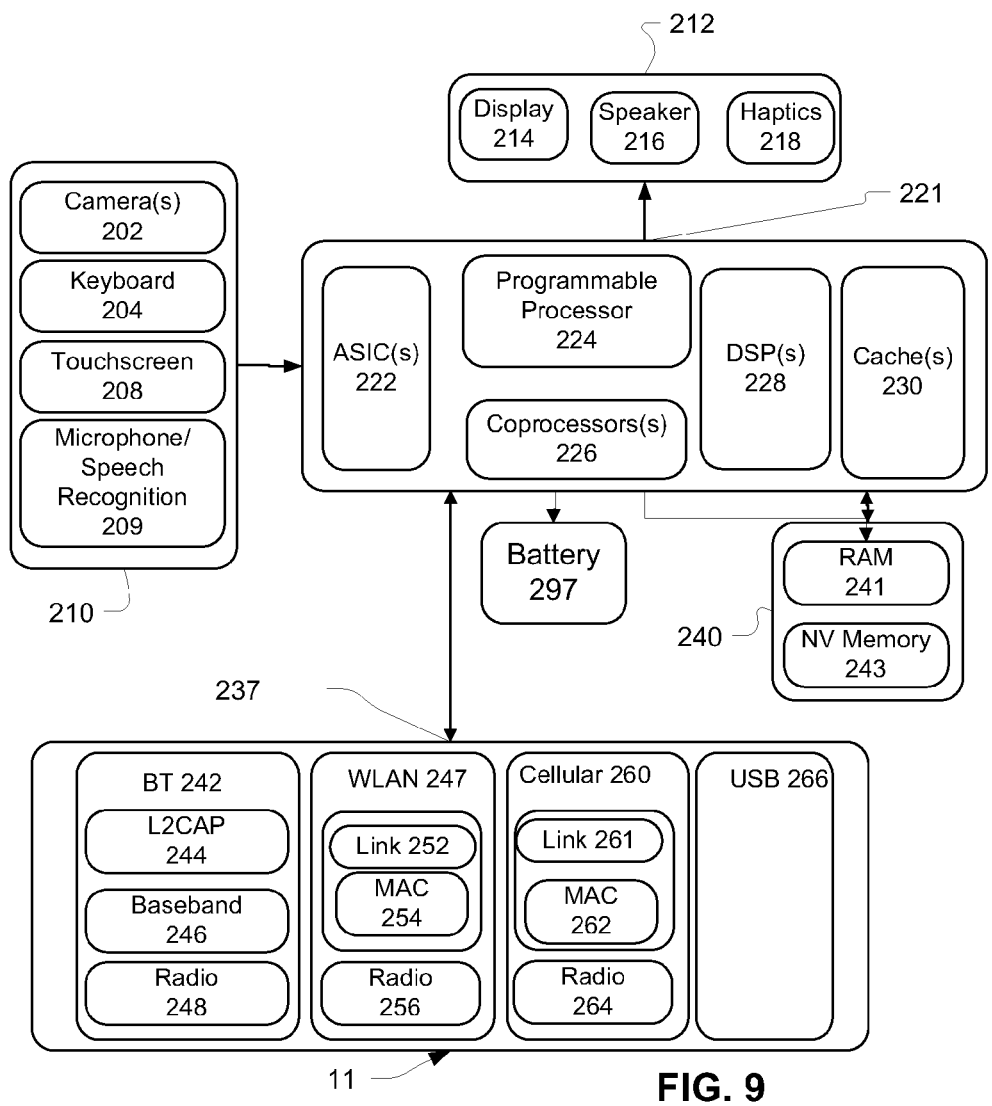
FIG. 9 depicts example constituent components of a device, portions of which can be used to implement RTT systems according to the disclosure, and components thereof, such as RTT servers and clients.

FIG. 9 depicts example components that can be used in implementing mobile device 11 according to the above description. FIG. 2 depicts that a processing module 221 may be composed of a plurality of different processing elements, including one or more ASICs 222, a programmable processor 224, one or more co-processors 226, which each can be fixed function, reconfigurable or programmable, and one or more digital signal processors 228. For example, an ASIC or co-processor 222 may be provided for implementing graphics functionality, encryption and decryption, audio filtering, and other such functions that often involve many repetitive, math-intensive steps. Processing module 221 can comprise memory to be used during processing, such as one or more cache memories 230.

Processing module 221 communicates with mass storage 240, which can be composed of a Random Access Memory 241 and of non-volatile memory 243. Non-volatile memory 243 can be implemented with one or more of Flash memory, PROM, EPROM, and so on. Non-volatile memory 243 can be implemented as flash memory, ferromagnetic, phase-change memory, and other non-volatile memory technologies. Non-volatile memory 243 also can store programs, device state, various user information, one or more operating systems, device configuration data, and other data that may need to be accessed persistently. A battery 297 can power device 11 occasionally, or in some cases, it can be a sole source of power. Battery 297 may be rechargeable.

User input interface 210 can comprise a plurality of different sources of user input, such as a camera 202, a keyboard 204, a touchscreen 208, and a microphone, which can provide input to speech recognition functionality 209. Output mechanisms 212 can include a display 214, a speaker 216 and haptics 218, for example. These output mechanisms 212 can be used to provide a variety of outputs that can be sensed by a human, in response to information provided from processing module 221.

Processing module 221 also can use a variety of network communication protocols, grouped for description purposes here into a communication module 237, which can include a Bluetooth communication stack 242, which comprises a L2CAP layer 244, a baseband 246 and a radio 248. Communications module 237 also can comprise a Wireless Local Area Network (247) interface, which comprises a link layer 252 with a MAC 254, and a radio 256. Communications module 237 also can comprise a cellular broadband data network interface 260, which in turn comprises a link layer 261, with a MAC 262. Cellular interface 260 also can comprise a radio 264 for an appropriate frequency spectrum.

Communications module 237 also can comprise a USB interface 266, to provide wired data communication capability. Other wireless and wired communication technologies also can be provided, and this description is exemplary.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A computer-implemented method for real time text transmission, comprising:
 accessing text output generated from a human audio source and metadata concerning characteristics of the human audio source;
 determining control commands to be associated with respective portions of the text output based on the metadata;
 forming packets containing the control commands and the associated portions of the text output, wherein the control commands conform to a pre-determined specification;
 sending the packets in a real time text session to one or more participant receiving devices.

2. The method of claim 1, wherein the control commands comprise commands for changing font color, and the method further comprises applying a different font color to all text determined to be a particular speaker detected in the human audio source.

3. The method of claim 1, wherein the control commands comprise commands for changing font size, and the method further comprises applying a larger font size to portions of text output determined to have been spoken at a comparatively loud volume.

4. The method of claim 1, wherein the control commands comprise commands for changing font size, and the method further comprises applying a smaller font size to portions of text output determined to have been spoken at a comparatively low volume.

5. The method of claim 1, further comprising distinguishing between different speakers from the human audio source, generating text information responsive to changes in the identity of the speaker, and inserting the generated text information in the packet proximate portions of text output associated with each speaker.

6. The method of claim 1, further comprising distinguishing between different speakers from the human audio source, and generating a control command indicative, in the pre-defined specification, of a change in speaker and including that control command in a packet containing the first text from a different speaker.

7. A tangible computer readable medium storing instructions for configuring a process to implement a method of real time text transmission, comprising:
 accessing text output generated from a human audio source and metadata concerning characteristics of the human audio source;
 determining control commands to be associated with respective portions of the text output based on the metadata;
 forming packets containing the control commands and the associated portions of the text output, wherein the control commands conform to a pre-determined specification;
 sending the packets in a real time text session to one or more participant receiving devices.

8. The tangible computer readable medium of claim 7, wherein the control commands comprise commands for changing font color, and the method further comprises applying a different font color to all text determined to be a particular speaker detected in the human audio source.

9. The tangible computer readable medium of claim 7, wherein the control commands comprise commands for changing font size, and the method further comprises applying a larger font size to portions of text output determined to have been spoken at a comparatively loud volume.

10. The tangible computer readable medium of claim 7, wherein the control commands comprise commands for changing font size, and the method further comprises applying a smaller font size to portions of text output determined to have been spoken at a comparatively low volume.

11. The tangible computer readable medium of claim 7, further comprising distinguishing between different speakers from the human audio source, generating text information responsive to changes in the identity of the speaker, and inserting the generated text information in the packet proximate portions of text output associated with each speaker.

12. The tangible computer readable medium of claim 7, further comprising distinguishing between different speakers from the human audio source, and generating a control code indicative, in the pre-defined specification, of a change in speaker.

13. A mobile device, comprising:
 a processor;
 a network interface for communicatively coupling with at least one network;
 a tangible computer readable medium storing instructions for configuring the processor to perform a method comprising
 receiving packets through the network interface;
 interpreting data in the packets as portions of text output, and control commands associated with respective portions of the text output, wherein the control commands are identified and interpreted according to a pre-determined specification;

determining text content and graphical modifications to the text content based on the portions of text output and the control commands; and causing the text content to be rendered with the determined graphical modifications on a display.

14. The mobile device of claim 13, wherein the control commands comprise commands for changing font color, and the method further comprises applying a different font color to all text associated with a font color change command.

15. The mobile device of claim 13, wherein the control commands comprise commands for changing font size, and the method further comprises applying a larger font size to portions of text output determined to have been spoken at a comparatively loud volume.

16. The mobile device of claim 13, wherein the control commands comprise commands for changing font size, and the method further comprises applying a smaller font size to portions of text output determined to have been spoken at a comparatively low volume.

17. The mobile device of claim 13, wherein the control commands comprise commands for distinguishing between different speakers from the human audio source, and the method further comprises generating text information responsive to changes in the identity of the speaker, and inserting the generated text information in the packet proximate portions of text output associated with each speaker.

18. The mobile device of claim 13, wherein the control commands comprise commands for distinguishing between different speakers from the human audio source, and the method further comprises generating a control command indicative, in the pre-defined specification, of a change in speaker and including that control command in a packet containing the first text from a different speaker.

* * * * *